(No Model.)
W. BORD.
DINNER PAIL.
No. 320,454. Patented June 23, 1885.
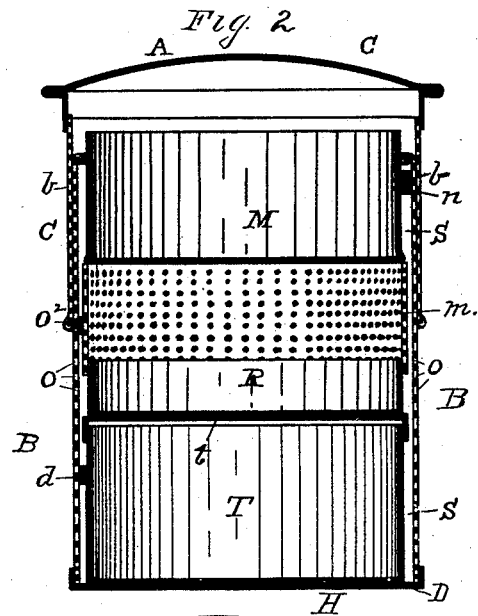
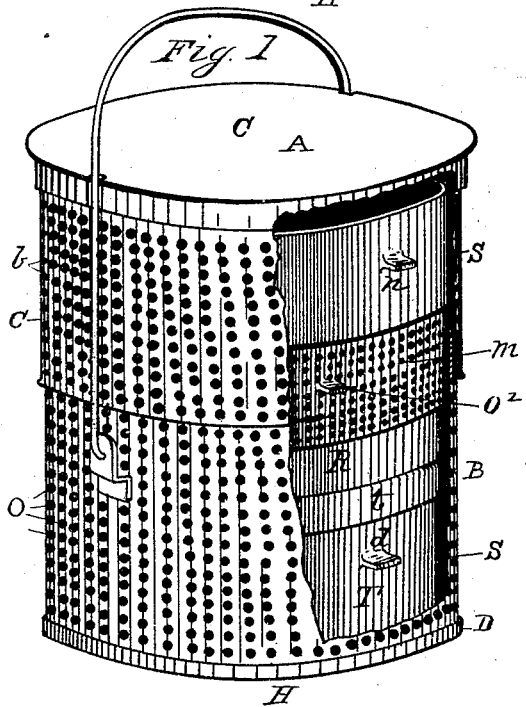
WITNESSES:
Stanley M. Holden
Charles S. Bruntnall
William Bord INVENTOR
BY
W. E. Hagan his ATTORNEY

United States Patent Office.

WILLIAM BORD, OF GREEN ISLAND, NEW YORK.

DINNER-PAIL.

SPECIFICATION forming part of Letters Patent No. 320,454, dated June 23, 1885.

Application filed October 30, 1884. (No model.)

*To all whom it may concern:*

Be it known that I, WILLIAM BORD, of the village of Green Island, county of Albany, State of New York, have invented a new and useful improvement in Dinner-Pails, of which the following is a specification.

My invention relates to certain improvements in that class of pails that are used by workmen to carry food in, and which are called "dinner-pails," my improvements having for their object the ventilation of the pails thus used, so that the odors emanating from the different kinds of food contained in the several compartments of the pail may pass out through the sides of the latter, so as to not affect by intermingling with each other the taste and flavor of each article of the food, as is the case where several different receptacles, each containing a separate kind of food, are inclosed in one close-fitting exteriorly-arranged vessel or pail.

Accompanying this specification, to form a part of it, there is a plate of drawings containing two figures illustrating a dinner-pail containing my invention and improvements, with the same designation of its parts by letter-reference used in both of them.

Of these illustrations, Figure 1 shows a section of a dinner-pail and its parts made according to my improved method, the said section being shown as taken vertically through the center of the pail. Fig. 2 shows a perspective of the dinner-pail with a portion of the exterior of the pail removed so as to show the interior arrangement of its parts.

The several parts of the pail are designated by letters of reference, and the function of the parts is described as follows:

The letter B indicates the body of the pail, the sides of which are preferably made of what is known as "perforated tin," having openings O, said body having a close sheet-metal bottom, D; and the letter C designates the cover, a portion of the sides of which, as designated at $b$, are preferably made of the same material as the body.

The letter A indicates the top of the cover, which is made of thin sheet metal, and the cover as thus formed is designed to slide on over the body telescopically. The bottom of the pail (indicated at H) is a close bottom, and has no openings therein.

The letter T designates a vessel having projections made on its side, as designated at $d$, the said vessel having a smaller diameter than the body of the pail, so that when inserted within the latter the projections will keep the sides of the vessel from coming in contact with the sides of the pail, and thus maintain between the vessel and pail the ventilating-space S. This vessel T is provided with a cover, $t$.

The letter R designates an open-top tray, which also has a diameter that is less than that of the pail-body, and which tray on its sides is provided with projections $O^2$ to preserve a space, S, between the tray and the pail-body when said tray is inserted within the latter. This tray has a part of its sides perforated, as indicated at $m$.

The letter M indicates another open-top tray or pan, having a continuous bottom, said tray M being made with a smaller diameter than the pail-body, and its sides being provided with projections $n$, which preserve a space, S, between the said tray and pail when the former is inserted within the latter.

In use the vessel T having a cover is best adapted to contain liquid and be placed in the bottom of the pail. Next above this tray T is placed the tray R, the latter being more particularly adapted to contain solid food, and above the tray R there is placed the tray M, adapted to contain pie, cake, or other like food.

As thus made a dinner-pail possesses many advantages, there being a ventilating-space, S, surrounding the vessel or trays as placed within the pail, and this space connecting with the atmosphere by means of apertures in the side walls of the pail, the odors coming from the different kinds of food contained in the several receptacles within the pail will pass out into the atmosphere, and by not being confined they do not cause each article of food to taste of the other.

While I have described and named perforated tin as the best material from which to form the ventilating side of the pail, any form of sheet metal provided with apertures may be used for that purpose, or to form the sides of such of the trays as are made with perforations therein.

If desired, the cover of the pail may be made with a shallow depth of sides, and the latter without perforations; but where the sides of the cover extend downwardly in an extent greater than one-fourth of the diameter of the cover, the sides should be wholly or in part perforated to prevent the cover, when passed downwardly over the pail, from closing the apertures in the sides of the latter to any extent.

If desired, the projections for maintaining the space S between the outer sides of the interiorly-placed vessels and the inner surface of the pail-sides may be formed on the latter instead of on the sides of the vessel or tray.

As the means for ventilating the pail consisting of an annular space produced between the interior of the pail sides and the outsides of the vessels or trays would, in combination with the projections in said space and apertures in the pail sides, perform the same function in the same manner by any arrangement of trays or vessels having these same features of construction and arrangement, I do not limit my application of these elements to their combination with the specific number or vertical arrangement of the trays or vessels which I illustrate and describe.

Having thus described my invention, what I claim, and desire to secure by Letters Patent, is—

1. In a dinner-pail, the combination of the pail-sides having perforations, trays, vessels, or food-receptacles having a less diameter than the pail-body, and adapted to be inserted within the latter, so as to leave an annular space between said vessels and the inner sides of the pail, and ribs or projections in said annular space, substantially as and for the purposes set forth.

2. In the dinner-pail, the combination of the sides made with perforations O, the trays R and M, and the vessel T, having smaller diameters than the pail-body, and adapted to be inserted in the latter, so as to produce the annular space S, and projections or ribs arranged in said annular space between the outer surface of said trays and vessel and the inner surface of the pail-sides, substantially as and for the purposes set forth.

3. In a dinner-pail, the combination of the perforations O made in the sides of the pail, the vessel T, the upper tray, M, and the middle tray, R, the latter made with side perforations, and said trays and vessel being constructed and adapted to be inserted and arranged within the pail-body, as shown and described.

Signed at Troy, New York, this 19th day of September, 1884, and in the presence of the two witnesses whose names are hereto written.

WILLIAM BORD.

Witnesses:
CHARLES S. BRINTNALL,
STANLEY M. HOLDEN.